(12) United States Patent
Rogge

(10) Patent No.: US 9,227,544 B2
(45) Date of Patent: Jan. 5, 2016

(54) VEHICLE LIFTER

(76) Inventor: Lawrence Rogge, Ghent, MN (US)

( * ) Notice: Subject to any disclaimer, the term of this patent is extended or adjusted under 35 U.S.C. 154(b) by 1040 days.

(21) Appl. No.: 13/067,326

(22) Filed: May 24, 2011

(65) Prior Publication Data

US 2011/0286823 A1 Nov. 24, 2011

Related U.S. Application Data

(60) Provisional application No. 61/347,603, filed on May 24, 2010.

(51) Int. Cl.
| | | |
|---|---|---|
| *B60P 1/43* | (2006.01) | |
| *B60P 1/02* | (2006.01) | |
| *B60P 3/10* | (2006.01) | |
| *B60P 3/12* | (2006.01) | |

(52) U.S. Cl.
CPC . *B60P 1/02* (2013.01); *B60P 1/433* (2013.01); *B60P 3/1033* (2013.01); *B60P 3/122* (2013.01)

(58) Field of Classification Search
CPC .......... B60P 1/433; B60P 1/4407; B60P 1/64; B60P 3/06
USPC .......... 414/462, 471, 477, 480; 224/496, 504, 224/508, 510, 511, 518, 553, 554, 555
See application file for complete search history.

(56) References Cited

U.S. PATENT DOCUMENTS

| | | | |
|---|---|---|---|
| 3,528,578 A | * | 9/1970 | Schoenberger ................ 414/462 |
| 3,550,800 A | * | 12/1970 | Robinson ....................... 414/462 |
| 3,567,054 A | | 3/1971 | Emke et al. |
| 3,596,735 A | | 8/1971 | Denier et al. |
| 3,667,631 A | | 6/1972 | Bishop |
| 3,843,115 A | | 10/1974 | Di Fulvio et al. |
| 3,883,020 A | * | 5/1975 | Dehn ............................ 414/498 |
| 3,888,368 A | | 6/1975 | Hawkins |
| 3,891,108 A | | 6/1975 | Traficant |
| 4,239,440 A | | 12/1980 | James |
| 4,274,788 A | * | 6/1981 | Sutton .......................... 414/462 |
| 4,300,867 A | | 11/1981 | Frees |
| 4,325,464 A | | 4/1982 | Larsson |
| 4,325,666 A | | 4/1982 | Chain et al. |
| 4,335,992 A | | 6/1982 | Reeves |
| 4,383,791 A | | 5/1983 | King |
| 4,391,345 A | | 7/1983 | Paul |
| 4,412,768 A | | 11/1983 | Bauer et al. |
| 4,534,544 A | | 8/1985 | Heide |
| 4,579,497 A | | 4/1986 | Nine |
| 4,652,201 A | | 3/1987 | Boughton |
| 4,722,651 A | | 2/1988 | Antal |
| 4,753,419 A | | 6/1988 | Johansson |
| 4,778,327 A | | 10/1988 | Tuffenkian et al. |

(Continued)

*Primary Examiner* — James Keenan
(74) *Attorney, Agent, or Firm* — Nikolai & Mersereau, P.A.; C. G. Mersereau

(57) ABSTRACT

Embodiments of the present invention can have one or more of the following features for a vehicle lifter: (a) a floor, (b) a frame operably coupled to the floor, the frame having a support extending from one end of the frame to an opposite end of the frame, (c) a trolley frame located between the frame and the support, (d) a support bar capable of being coupled to a vehicle, (e) a hydraulic lifter operably coupled to the support bar and the trolley frame, (f) a wheel operably coupled to the trolley frame, (g) a winch operably coupled to the trolley frame, (h) a winch line operably coupled to the winch at one end and to the frame at another end, (i) a housing coupled to the trolley frame, (j) a hydraulic motor within the housing, and (k) a hydraulics container within the housing.

17 Claims, 11 Drawing Sheets

(56) References Cited

U.S. PATENT DOCUMENTS

| | | | |
|---|---|---|---|
| 4,921,385 A | 5/1990 | Okuno | |
| 5,016,858 A | 5/1991 | Mitchell | |
| 5,100,283 A * | 3/1992 | Carty | 414/590 |
| 5,462,136 A | 10/1995 | Schoenmaker et al. | |
| 5,816,764 A | 10/1998 | Bohata | |
| 6,099,227 A | 8/2000 | Shellhammer | |
| 6,182,797 B1 | 2/2001 | Tebbe et al. | |
| 6,357,991 B1 * | 3/2002 | Hamlett | 414/538 |
| 6,364,060 B1 | 4/2002 | Cherry | |
| 6,402,457 B1 * | 6/2002 | Maeno | 414/812 |
| 6,698,994 B2 * | 3/2004 | Barrett | 414/462 |
| 6,767,171 B2 * | 7/2004 | Kelly | 414/462 |
| 6,866,315 B2 * | 3/2005 | Adams et al. | 296/3 |
| 6,883,641 B2 | 4/2005 | Julien | |
| 7,011,486 B2 | 3/2006 | Dyer | |
| 7,182,177 B1 | 2/2007 | Simnacher | |
| 7,354,236 B1 * | 4/2008 | Springer | 414/538 |
| 7,441,494 B2 | 10/2008 | Aulbach et al. | |
| 8,011,543 B2 * | 9/2011 | Premartin et al. | 224/511 |
| 2002/0125662 A1 | 9/2002 | Magness | |
| 2002/0136621 A1 * | 9/2002 | Scherle | 414/480 |
| 2002/0148870 A1 * | 10/2002 | Zimmerman | 224/492 |
| 2005/0263354 A1 | 12/2005 | Perkins | |
| 2007/0290181 A1 | 12/2007 | Bell | |
| 2008/0085176 A1 * | 4/2008 | Statkus | 414/462 |
| 2009/0025154 A1 | 1/2009 | Smith | |

\* cited by examiner

VEHICLE LIFTER

CROSS-REFERENCE TO RELATED APPLICATIONS

This application is related to provisional patent application No. 61/347,603, filed on May 24, 2010, titled Vehicle Lifter listing Lawrence Rogge as the inventor. The present application claims priority to and incorporates by reference in its entirety provisional patent application No. 61/347,603 listed directly above.

BACKGROUND OF THE INVENTION

I. Field of the Invention

Embodiments of the present invention relate to vehicles. Particularly, embodiments of the present invention relate to the transportation of vehicles and other materials. More particularly, embodiments of the present invention relate to an apparatus for loading, unloading and transporting vehicles and other materials.

II. Discussion of Related Art

Presently, the most common type of transportation for work or recreational vehicles is trailers which can be towed by a larger vehicle. Some vehicles, such as motorcycles or lawnmowers, can be transported in the bed of a pickup truck; however, this type of transportation usually requires a ramp or several people to load the vehicle into the pickup bed. This can be a difficult operation as most ramps are very narrow and the vehicle can often navigate off of the ramp possibly causing injury to personal or to the vehicle. If people are manually loading a vehicle in a pickup bed, the risk of injury increases as most vehicles are very heavy ranging anywhere from 250 lbs. and greater. Therefore, it is most common to see work or recreational vehicles, such as ATV's or lawnmowers, transported via a trailer towed by a pickup or other larger vehicle.

A trailer is generally an unpowered vehicle pulled by a powered vehicle. Commonly, the term trailer refers to such vehicles used for the transport of goods and materials. Some trailers are made for personal or small business use with practically any powered vehicle having an appropriate hitch. Enclosed toy trailers and motorcycle trailers can be towed by a commonly accessible pickup truck or van, which generally requires no special permit beyond a regular driver's license. Specialized trailers like open-air motorcycle trailers and bicycle trailers are much smaller and accessible to small automobiles as are some simple trailers, which are pulled by a drawbar and riding on a single set of axles. Other trailers, such as utility trailers and travel trailers come in single and multiple axle varieties to allow for varying sizes of tow vehicles.

A utility trailer is a trailer designed to haul work and/or recreational vehicles behind an automobile or truck. Such trailers may be open or enclosed, ranging in size from trailers capable of carrying several vehicles or only one. They may be designed specifically to carry vehicles, with ramps and tie-downs, or may be a utility trailer adapted permanently or occasionally to haul one or more vehicle.

While utility trailers can be very useful, they do restrict the user wishing to transport a vehicle in several ways. The user must locate the trailer, then move the work or recreational vehicle onto the utility trailer and then connect the utility trailer up to the transport vehicle (not necessarily in this order). This operation can become a tedious and laborious task for the user depending on several variables. If the user is in a remote location, such as deep within a field or construction site, it can be very inconvenient for the user to drive all the way back to the location of the trailer, hook up the trailer and then return back to the location of the work or recreation vehicle. Further, the loading of the work or recreational vehicle onto the utility trailer can be cumbersome and difficult due to the weight of the work or recreational vehicle and the fact most utility trailers are imbalanced when not connected to the towing vehicle. Finally, connecting the utility trailer to the towing vehicle can be difficult and cumbersome as the user must typically manually move the utility trailer to the towing vehicle, align the towing trailer and then manually connect the utility trailer to the towing vehicle.

Presently, there are several types of work and/or recreational vehicles. A listing and discussion of these vehicles are given below for the reader's understanding of the present invention discussed in great detail below.

An all-terrain vehicle (ATV), also known as a quad, quad bike, three-wheeler or four-wheeler is defined by the American National Standards Institute (ANSI) as a vehicle traveling on low pressure tires with a seat straddled by the operator along with handlebars for steering control. It is designed to handle a wider variety of terrain than most other vehicles. ATVs are intended for use by a single operator, although some companies have developed ATVs intended for use by the operator and one passenger. These ATVs are referred to as tandem ATVs. The rider sits on and operates these vehicles like a motorcycle, but the extra wheels give more stability at slower speeds. Although typically equipped with three or four wheels, six-wheel models exist for specialized applications.

A personal water craft (PWC) is a recreational watercraft the rider sits or stands on, rather than inside of, as in a boat. Models have an inboard engine driving a pump jet having a screw-shaped impeller to create thrust for propulsion and steering. They are often referred to by the brand names Jet Ski™, WaveRunner™ or Sea-Doo™. Most are designed for two or three people though four-passenger models exist.

A motorcycle (also called a motorbike, bike, or cycle) is a single-track, engine-powered, two-wheeled motor vehicle. Motorcycles vary considerably depending on the task for which they are designed, such as long distance travel, navigating congested urban traffic, cruising, sport and racing or off-road conditions. Motorcycles are one of the most affordable forms of motorized transport in many parts of the world and for most of the world's population; they are also the most common type of motor vehicle. There are around 200 million motorcycles (including mopeds, motor scooters and other powered two and three-wheelers) in use worldwide, or about 33 motorcycles per 1000 people.

A lawn mower is a machine using a revolving blade or blades to cut a lawn at an even length. Lawn mowers employing a blade rotating about a vertical axis are known as rotary mowers, while those employing a blade assembly rotating about a horizontal axis are known as cylinder or reel mowers. Many different designs have been made, each suited to a particular purpose. The smallest types, pushed by a human, are suitable for small residential lawns and gardens, while larger, self-contained; ride-on mowers are suitable for large lawns.

Go-carts are small, open, four-wheeled vehicles, often called karts, go-karts, or gearbox/shifter karts depending on the design. They are usually raced on scaled-down circuits. Karts vary widely in speed and some (known as Superkarts) can reach speeds exceeding 160 miles per hour (260 km/h), while go-karts intended for the general public in amusement parks may be limited to speeds of no more than 15 miles per hour (24 km/h).

A snowmobile, also known in some places as a snowmachine, or sled, is a land vehicle for winter travel on snow.

Designed to be operated on snow and ice, they require no road or trail. Design variations enable some machines to operate in deep snow or forests while most are used on open terrain including frozen lakes, or driven on paths or trails. Usually built to accommodate a driver and perhaps one adult passenger; much like motorcycles and ATVs. They have no enclosure other than a windshield and their engine normally drives a continuous track or tracks at the rear while skis at the front provide directional control. Originally intended as a winter utility vehicle to be used where other vehicles cannot go, they appealed to hunters and workers transporting personnel and materiel across snow-covered land, frozen lakes and rivers. In the latter part of the 20th century, they have been put to use for recreational purposes as well. The contemporary types of recreational riding forms are known as snowcross/racing, trail riding, freestyle, mountain climbing, boondocking, carving, ditchbanging and grass drag.

A golf cart or golf buggy is a small vehicle designed originally to carry two golfers and their golf clubs around a golf course or on desert trails with less effort than walking. Golf cars come in a wide range of formats and are more generally used to convey small numbers of passengers short distances at speeds less than 15 mph (24 km/h). They are generally around 4 feet (1.2 m) wide×8 feet (2.4 m) long×6 feet (1.8 m) high and weigh 900 pounds (410 kg) to 1,000 pounds (450 kg). Most are powered by 4-stroke engines. When purpose-built for general transportation these are called Neighborhood Electric Vehicles (NEVs), but with various operating limitations such as top speed and heavy regulation on which type of streets these types of cars are permitted to be used.

A snow blower or snow thrower is a machine for removing snow from an area where it is not wanted, such as a driveway, sidewalk, roadway, railroad track, rink, runway or house. The term "snow thrower" is often used to encompass snow throwers and snow blowers, however, a snow thrower is a machine using a single stage to remove or "throw" snow while a snowblower uses two stages to remove or "blow" snow. Snow throwers range from the very small, capable of removing only a few inches (a few cm) of light snow in an 18 to 20 in (457 to 508 mm) path, to the very large, mounted onto heavy duty winter service vehicles and capable of moving 10-foot (3.05 m) wide, or wider, swaths of heavy snow up to 6 feet (1.83 m) deep.

Typically these above described vehicles and other items typically transported by pickup trucks will not fit well within the box of a pickup truck, especially when the pickup has a tool box, other materials already within the truck bed or the truck has an extended cab. Further, the tailgate of a pickup often times is not strong enough to support the weight of a vehicle described above or any other type of material carried by a pickup.

It would be desirable to be able to have an apparatus which could lift a work and/or recreational vehicle or other materials into the back of a pickup without any lifting of the vehicle or materials by the owner or the need for any ramp to place the vehicle in the truck bed. It would also be desirable to provide a faster and cheaper way to carry a work and/or recreational vehicle or other materials without having to connect a trailer. It would be desirable to eliminate the need for a trailer to transport a work and/or recreational vehicle or other materials. It would be desirable to eliminate the amount of time it takes to load a work and/or recreational vehicle or other materials into a truck bed. It would be desirable to eliminate the need to locate a trailer when a user wants to transport a work and/or recreational vehicle or other materials.

SUMMARY OF THE INVENTION

Embodiments of the present invention can have one or more of the following features for a vehicle lifter: (a) a floor, (b) a frame operably coupled to the floor, the frame having a support extending from one end of the frame to an opposite end of the frame, (c) a trolley frame located between the frame and the support, (d) a support bar capable of being coupled to a vehicle, (e) a hydraulic lifter operably coupled to the support bar and the trolley frame, (f) a wheel operably coupled to the trolley frame, (g) a winch operably coupled to the trolley frame, (h) a winch line operably coupled to the winch at one end and to the frame at another end, (i) a housing coupled to the trolley frame, (j) a hydraulic motor within the housing, and (k) a hydraulics container within the housing.

Embodiments of the present invention can have one or more of the following features for a lifter: (a) a frame having a front end, a rear end, a left side and a right side, the frame having at least one support extending downward from the front end then perpendicular to the frame and then upward to the rear end, (b) a floor coupled to the frame, (c) a trolley frame located between the frame and the support, the trolley frame having a top bar, a bottom bar, a right side bar and a left side bar, (d) a support bar capable of being coupled to a vehicle, (e) a hydraulic lifter operably coupled to the support bar and the trolley frame, (f) at least one arm operably coupled to the support bar and the trolley frame, (g) at least one vertical wheel coupled to the right side bar and the left side bar, (h) at least one horizontal wheel coupled to the top bar and the bottom bar, (i) a winch operably coupled to the trolley frame, (j) a winch line operably coupled to the winch at one end and to the frame a finger coupled to a support adjacent to the front end of the frame, and (k) at least one mounting bracket coupled to the support bar for coupling the lifter to a vehicle.

Embodiments of the present invention can have one or more of the following features for a lifter: (a) a support bar capable of being coupled to a pickup, (b) a frame having a front end, a rear end, a left side and a right side, the frame having at least one support extending downward from the front end then perpendicular to the frame and then upward to the rear end, (c) a floor coupled to the frame, (d) a trolley frame located between the frame and the support, the trolley frame having a top bar, a bottom bar, a right side bar and a left side bar, (e) a hydraulic lifter operably coupled to the support bar and the trolley frame, (f) an inner arm operably coupled to the top bar of the trolley frame and the support bar, (g) an outer arm operably coupled to the support bar and the bottom bar of the trolley frame, (h) a winch operably coupled to the trolley frame, (i) a winch line operably coupled to the winch at one end and to the frame a finger coupled to a support adjacent to the front end of the frame, and (j) a control panel electrically coupled to winch.

DESCRIPTION OF PREFERRED EMBODIMENT

Figure 1:
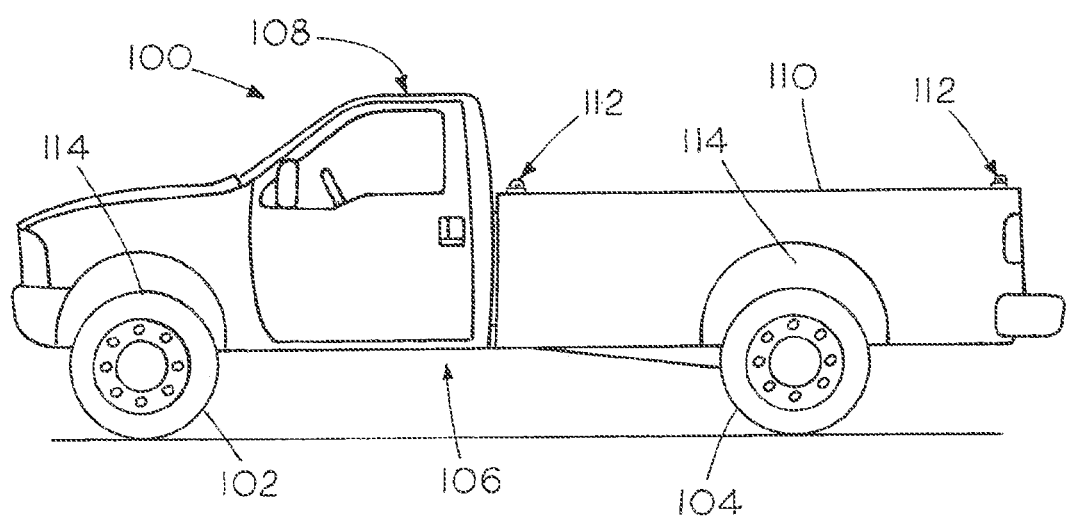
FIG. 1 shows an elevated side view of a cab pickup truck in an embodiment of the present invention.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are described with respect to ATV's and PWC's it is entirely contemplated embodiments of the present invention could be extended to dirt bikes, motorcycles, four-wheelers, rangers, snowmobiles, go-carts, golf-carts, jet-skis, lawn mowers, snow blowers, furniture and appliances, rental equipment, wheel chairs, oil barrels, lumber, shingles, sheetrock, landscape rock, black dirt, gravel, small trees, farm supplies, round and square bales (straw or hay) and skid loader attachments.

In some embodiments of the present invention, an apparatus can lift objects to a position allowing the apparatus, with the object, to slide or shift into a top section of a bed of a pickup or any other vehicle capable of carrying the object. While embodiments of the present invention are discussed with respect to a pickup having an open bed, the inventor fully contemplates most any vehicle capable of carrying cargo could be used, such as a tractor-trailer, without departing from the spirit of the invention. Further, the inventor fully contemplates other truck beds, such as an closed-bed or flat-bed, could be used without departing from the spirit of the invention.

In some embodiments of the present invention, a user can drive a vehicle or place an object on a platform and allow for hydraulics to lift the object into the bed of a pickup truck. Some embodiments of the present invention substantially reduce any manual labor to lift a vehicle or object into the bed of a pickup to carry the vehicle or object from location to location. In some embodiments of the present invention, potentially any user having an ATV, PWC, go-cart, motorcycle or golf cart can lift their vehicle into a larger vehicle with little to no effort. The user can easily connect the lifting apparatus of the present invention to a larger vehicle, such as a pickup bed, in little time and with little effort.

With reference to FIG. 1, an elevated side view of a cab pickup truck in an embodiment of the present invention is shown. A pickup truck 100 commonly has a set of front tires 102, a set of rear tires 104 and a frame (not shown) which supports a body 106. Body 106 commonly has a cab 108, which commonly houses the driver of truck 100, and a bed 110, which is commonly used to carry objects the driver wishes to carry with him/er or to carry from one location to the next. It will be noted conventional tie-down anchors 112 at the four corners of bed 110 can be used to secure objects in bed 110 to prevent them either from moving during transportation or from being blown out of bed 110 during transportation. Body 106 commonly has wheel wells 114, which accommodate front tires 102 and rear tires 104. Wheel wells 114 are discussed in more detail below. As is commonly known, pickup 100 can be propelled by an engine (not shown) located under body 106 at the front of pickup 100. The engine provides a means for transportation for the driver and any cargo within bed 110.

Figure 2:
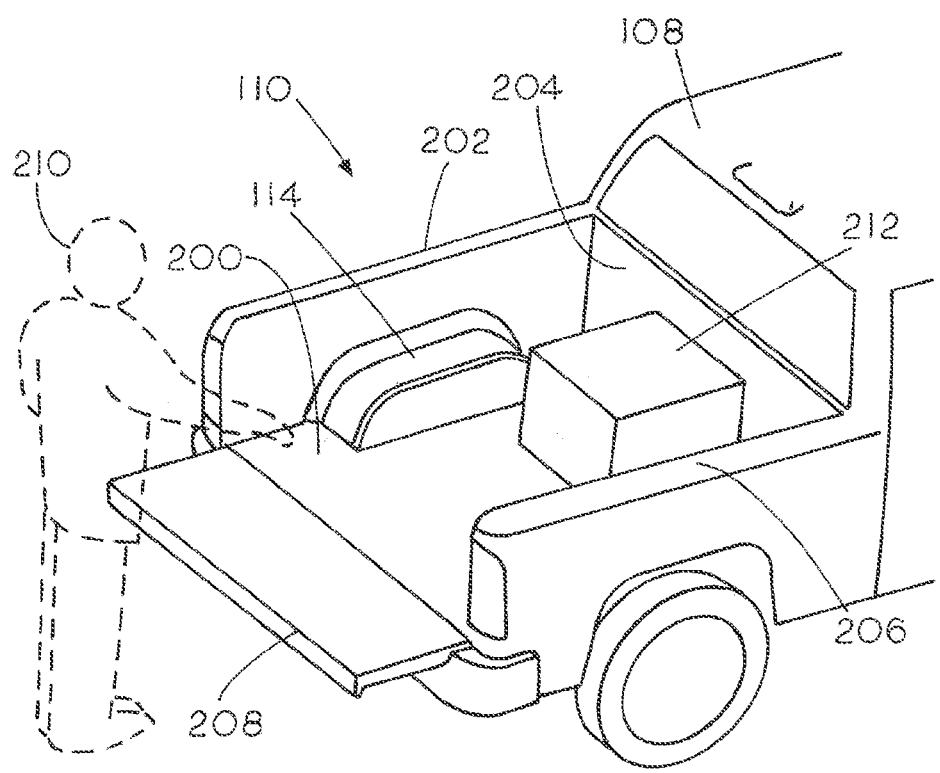
FIG. 2 shows a perspective view of a pickup truck bed in an embodiment of the present invention.

With reference to FIG. 2, a perspective view of a pickup truck bed in an embodiment of the present invention is shown. Pickup truck bed 110 commonly has a bed floor 200 bounded by a left side wall 202, a front wall 204, a right side wall 206 and a tail gate 208. Arches of wheel well 114 interrupt the smooth surface of bed floor 200. Tail gate 208 is shown folded down into an open position where it lies approximately parallel to bed floor 200. Operator/driver (user) 210 is standing immediately to the rear of tail gate 208, in a position suitable for removing cargo from bed floor 200. Cargo 212 is shown lying near front wall 204 adjacent to cab 108. Those familiar with the art will know cargo often ends up in this position. Even if cargo 212 is originally placed near tail gate 208, it will tend to slide forward during braking.

Figure 3:
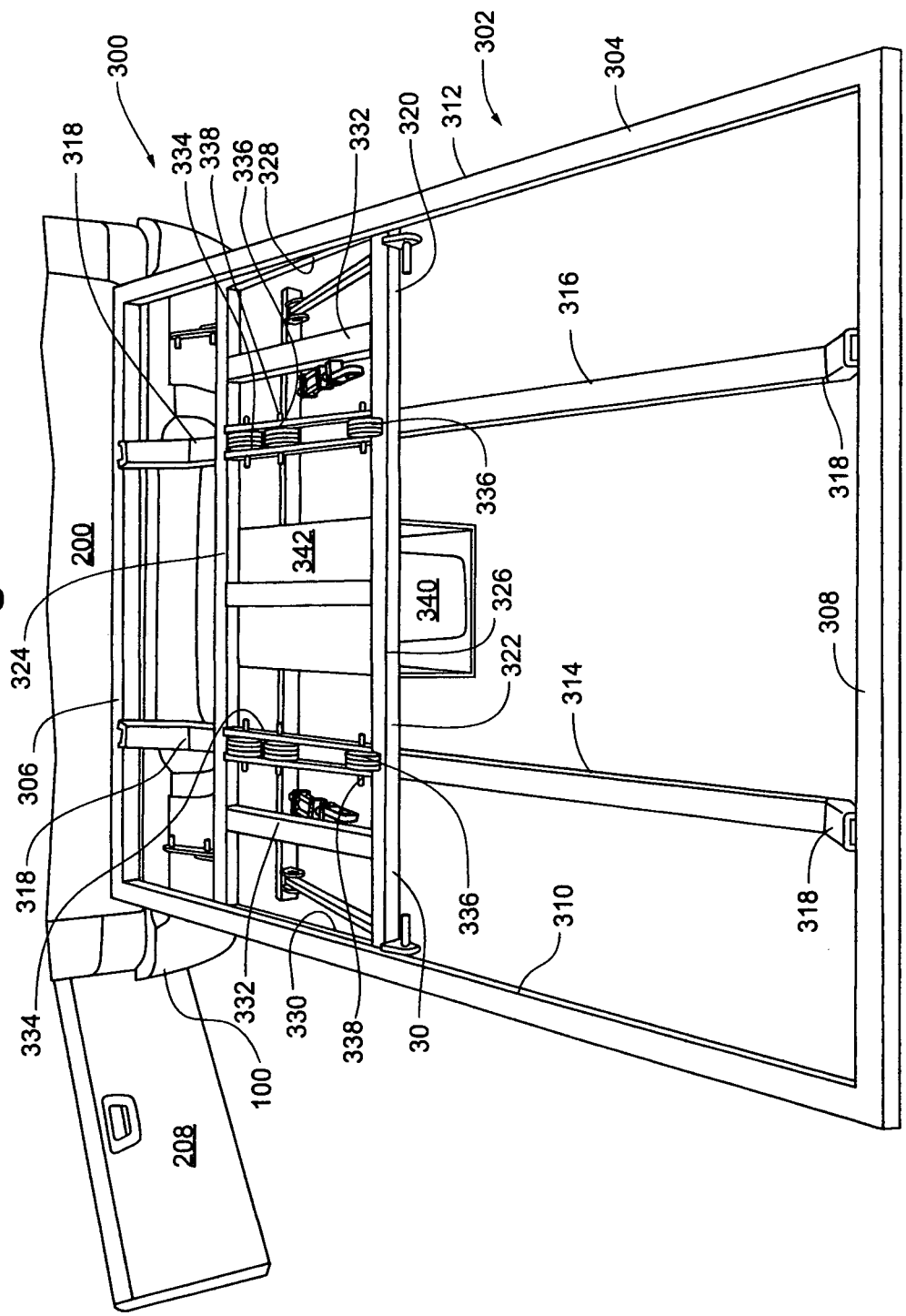
FIG. 3 shows an elevated rear view of a pickup truck bed with a vehicle lifter in an extended position in an embodiment of the present invention.

With reference to FIG. 3, an elevated rear view of a pickup truck bed with a vehicle lifter in an extended position in an embodiment of the present invention is shown. The rear of pickup 100 is shown with tail gate 208 removed to accommodate vehicle lifter 302. However, it is fully contemplated vehicle lifter 302 could be used with tail gate 208 attached to pickup 100 without departing from the spirit of the invention. Pickup rear 300 can be coupled to a vehicle lifter 302 in an embodiment of the present invention and is discussed in more detail below. Vehicle lifter 302, is shown with the lifter floor removed (shown in more detail below); however, vehicle lifter 302 can have a frame 304, which can be a box frame having an front end 306, a rear end 308, a left side 310 and a right side 312. Supports 314 and 316 are coupled at one end to rear end 308 and at an opposite end to front end 306. Supports 314 and 316 can provide support and a track for trolley 320 to move frame 304 from an extended position (e.g., FIG. 3) to a stowed position (e.g., FIG. 4) as will be described in greater detail below. Supports 314 and 316 can have elbows 318. Elbows 318 allow supports 314 and 316 to extend downward from frame 304 where supports 314 and 316 lay beneath frame 304, but extend substantially parallel to sides 310 and 312 from rear end 308 to front end 306. Supports 314 and 316 are capable of allowing trolley 320 to roll upon supports 314 and 316 as frame 304 is slide into and out of truck bed 200, which is discussed in more detail below. While trolley 320 can roll upon supports 314 and 316, trolley 320 supports left side 310 and right side 312 of frame 304 with left side bar 330 and right side bar 328 of trolley frame 322 respectively. Thus, trolley frame 322 lies between front end 306 and rear end 308 and supports 314 and 316.

Trolley 320 can have a frame 322. Trolley frame 322 can have top bar 324, a bottom bar 326, a right side bar 328 and a left side bar 330. Trolley frame 322 can also have supports 332 which extend from bottom bar 326 to top bar 324. Frame 322 can also have a wheel end and to support bar 406 at another end. Hydraulic lifters 404 can be attached to both trolley supports 332 and support bar 406 by a nut and bolt assembly or dowels at apertures 412. Apertures 412 can be integral with trolley supports 332 and support bar 406 or apertures 412 can be welded on. While the apertures 408, 410 and 412 could be welded on, it is fully contemplated apertures 408, 410 and 412 could be attached to trolley frame 322 or support bar 406 in most any manner without departing from the spirit of the invention. Hydraulic lifters 404 can be attached to trolley supports 332 at either a forward position adjacent to the bottom bar 326, a rearward position adjacent to top bar 324 or at a center position. However, the inventor has found it advantageous to have hydraulic lifters 404 attach to trolley supports 332 at a center to forward position adjacent to bottom bar 326 so hydraulic lifters 404 do not contact pickup rear 300 when vehicle lifter 302 is in the lifted and stowed position.

Outer arm 400 and inner arm 402 can act in tandem to provide a strong and stable support for whatever item is being lifted into the back of truck bed 110. Further, outer arm 400 and inner arm 402 can act to provide a planar surface for whatever is being loaded or unloaded from truck bed 110. Outer arms 400 and inner arms 402 can be set to a length, which allows trolley frame 322 to rest as an approximately flat surface or a 0° angle to the horizon when vehicle lifter 302 is in the stowed position. When vehicle lifter 302 is being moved into the extended position (e.g., FIG. 3) both outer arm 400 and inner arm 402 move away from bed floor 200 together to place trolley frame 322 in a "ramp" position to allow any vehicle or material to be easily loaded onto vehicle lifter 302. It is fully contemplated trolley frame 322 could be at most any angle greater than 0° to less than 90° in the extended position without departing from the spirit of the invention. However, it is contemplated when vehicle lifter 302 is in the extended position, the trolley frame angle to ground would be between 10° and 50° to allow for easier access to bed floor 200.

Figure 4:
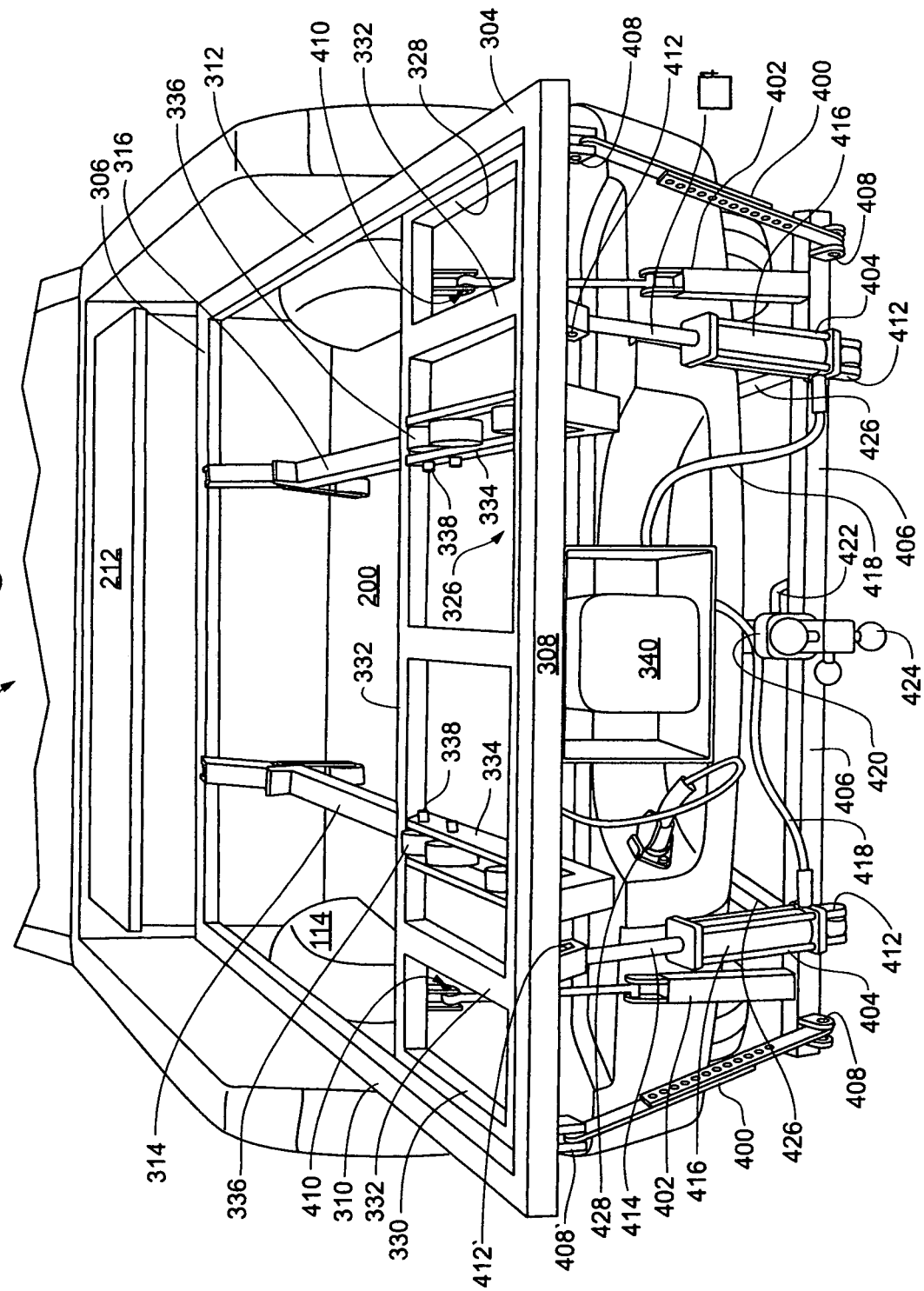
FIG. 4 shows an elevated rear view of a pickup truck bed with a vehicle lifter in a stowed position in an embodiment of the present invention.

Hydraulic lifters 404 are shown in an extended state in FIG. 4. Hydraulic cylinders 414 are shown raised from hydraulic body 416. Hydraulic lifters 404 are supplied with hydraulic oil within hydraulic container 340 by a hydraulic pump (not shown), which pumps hydraulic oil through hydraulic hoses 418. When hydraulic lifters 404 are in an extended position as shown in FIG. 4, vehicle lifter 302 is in a raised position where frame 334 which extends from bottom bar 326 to top bar 324 and house transfer wheels 336. Wheels 336 are held in place and can rotate upon a dowel 338, which extends from one side of wheel frame 334 to an opposite side of wheel frame 334. Wheels 336 allow trolley frame 322 to move along supports 314 and 316 as frame 304 is slide into and out of truck bed 304. Trolley frame 322 can also have a housing 342 located below trolley frame 322, which can hold a hydraulic fluid container 340 and a motor (discussed in detail below). Trolley frame 322 can have vertical wheels 336 and horizontal wheels (discussed in detail below) which allow trolley frame 304 to move along supports 314 and 316 and allow left side 310 and right side 312 to roll along wheels located on right side bar 328 and left side bar 330 (shown in more detail below). FIG. 3, shows vehicle lifter 302 in an extended or down position. The extended or down position would be the preferred position to have vehicle lifter 302 in when loading a vehicle or other materials upon vehicle lifter 302.

With reference to FIG. 4, an elevated rear view of a pickup truck bed with a vehicle lifter in a stowed position in an embodiment of the present invention is shown. Frame 304 (with floor removed) shown in a lifted and stowed position, can be supported by outer arms 400 and inner arms 402. Hydraulic lifters 404 can act to support frame 304, but can also act to lift frame 304 as well. Outer arms 400 can be attached to trolley frame 322 at bottom bar 326 and at another end to support bar 406. Outer arms 400 can be attached to trolley frame 322 and support bar 406 by a nut and bolt assembly or dowels inserted into apertures 408. Apertures 408 can either be integral with trolley frame 322 and support bar 406 or they can be welded to trolley frame 322 and support bar 406.

Inner arm 402 can be attached to trolley frame 322 at top bar 324 at one end and to support bar 406 at another end. Similar to outer arm 400, inner arm 402 can be attached to trolley frame 322 and support bar 406 by welding, shown at the attachment of inner arm 402 with support bar 406, or it can also be attached by a nut and bolt assembly or dowels as shown where inner arm 402 is attached to top bar 324 with a nut and bolt assembly at aperture 410. Similarly, apertures 410 can be integral with top bar 324 or they can be welded to top bar 324 without departing from the spirit of the invention.

Hydraulic lifters 404 can be attached to trolley frame 322 at trolley supports 332 at one frame 304 is supported by trolley frame 322. As hydraulic lifters 404 begin to lower and hydraulic cylinders 414 begin to lower into hydraulic body 416 trolley frame 322 is gradually pulled upon by hydraulic lifters 404 thus lowering vehicle lifter 302 into the extended position (e.g., FIG. 3) or lowered position, discussed above, so materials can be easily loaded onto or off of vehicle lifter 302. Any discussion regarding hydraulic operation is not included in this embodiment as the operation of hydraulics is commonly known in the art.

Support bar 406 is shown coupled to the vehicles frame (not shown) via a receiver type trailer hitch 420. Support bar 406 has a male bracket (not shown) which can be inserted into hitch 420 and held in place with a lock pin 422. Further, support bar 406 can also have a receiver hitch to allow the user to mount a ball hitch 424 so the user is still able to tow or carry other devices such as trailers or cargo carriers. Also seen is electrical vehicle outlet 428, which provides power to electrical components such as a hydraulic pump motor (not shown), a winch and other electrical components. Support bar 406 can also have support arms 426 which can extend from the ends of support bar 406. Support arms 426 can be attached to the frame of pickup 100 to provide greater stability during operation of vehicle lifter 302.

The embodiments of FIGS. 3 and 4 represent a vehicle lifter which can be hard mounted or permanently mounted to a pickup. The embodiments discussed below discuss a vehicle lifter which could be mounted and unmounted to a pickup truck.

Figure 5:
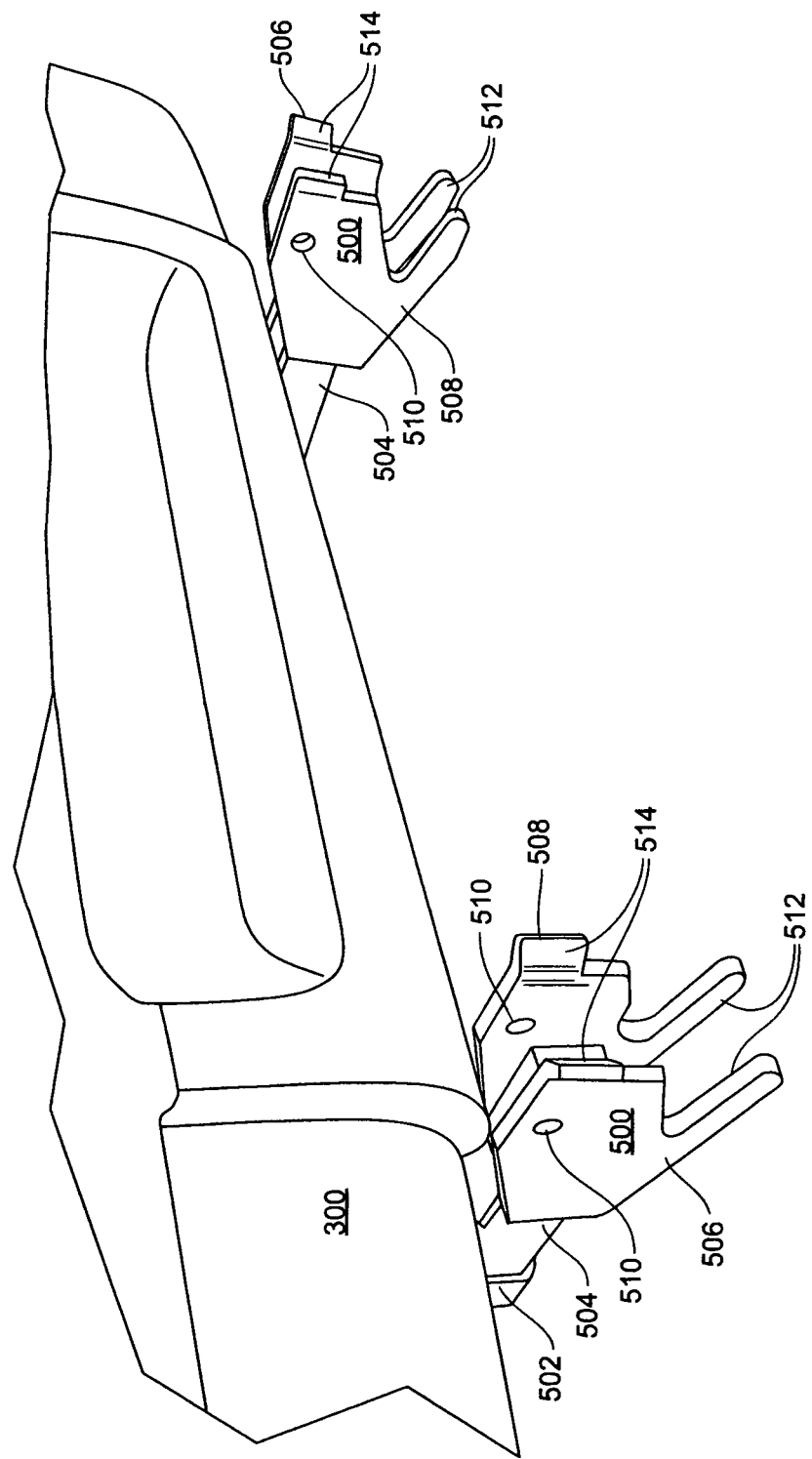
FIG. 5 shows a connection joint on the rear of a pickup in an embodiment of the present invention.

With reference to FIG. 5, a connection joint on the rear of a pickup in an embodiment of the present invention is shown. Connection joint(s) 500 is shown attached to truck frame 502 by a weld. While this embodiment shows connection joint 500 being welded to truck frame 502, it is fully contemplated connection joint 500 could be attached to truck frame 502 in most any manner including a nut and bolt assembly without departing from the spirit of the invention. Connection joint 500 extends from truck frame 502 via an arm 504 to allow connection joint 500 to extend beyond pickup rear 300. Connection joint 500 can be attached to arm 504 by welding or most any type of connection methods known in the art. Connection joint 500 can have two independent sides, an outer plate 506 and an inner plate 508. Each plate 506 and 508 can have an upper aperture 510 in which to receive a cotter pin assembly (not shown). Each plate 506 and 508 can also have a jaw portion 512 located on the lower front of each plate 506 and 508. Each plate can have an extension tooth 514. Extension tooth 514 extends from the upper portion of connection joint 500. Extension tooth 514 acts as a guide when vehicle lifter 302 is coupled to connection joint 500. The connection of connection joint 500 to vehicle lifter 302 is discussed in greater detail below.

Figure 6:
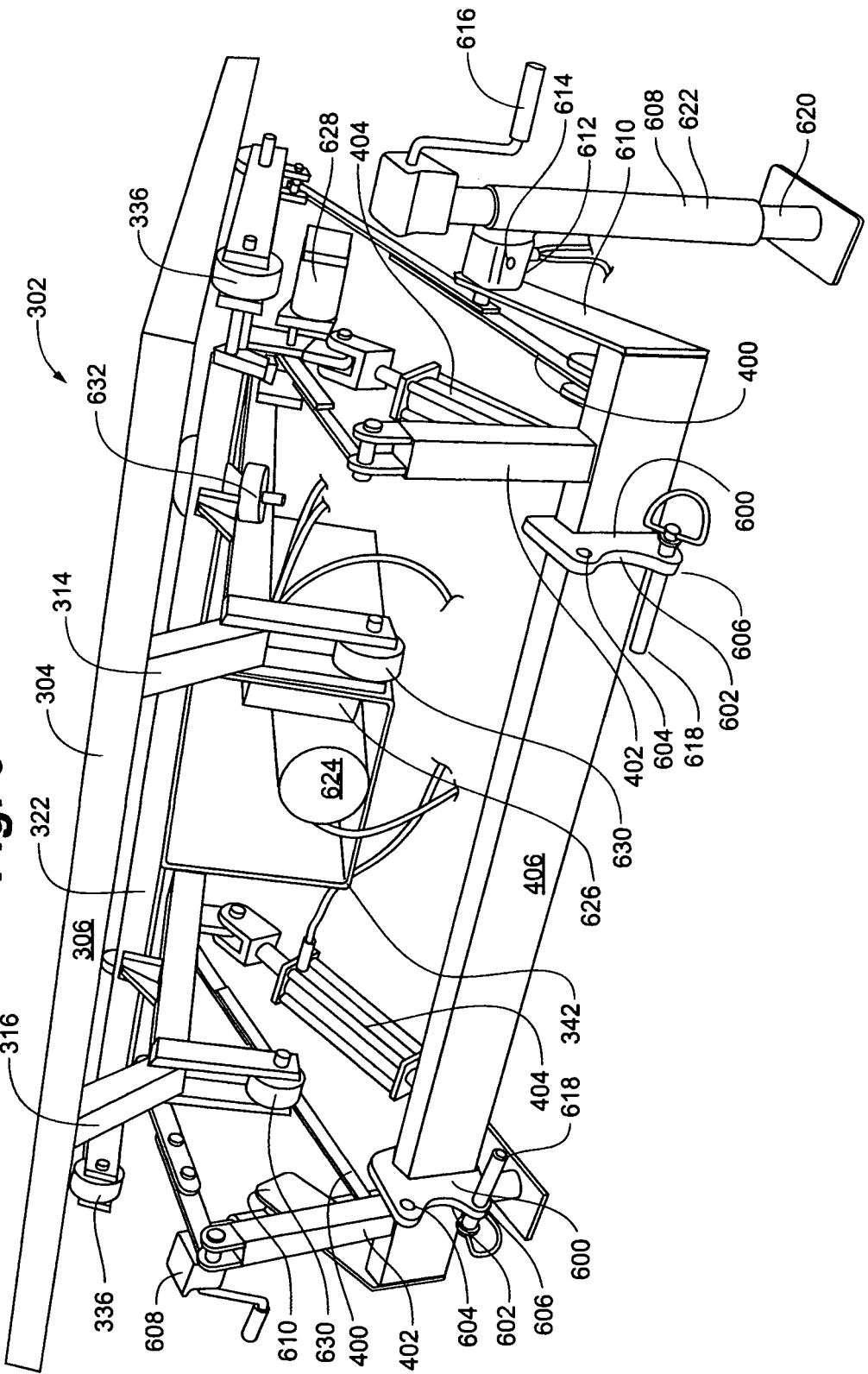
FIG. 6 shows an elevated front view of a vehicle lifter in an embodiment of the present invention.

With reference to FIG. 6, an elevated front view of a vehicle lifter in an embodiment of the present invention is shown. Support bar 406 can have mounting brackets 600, which allow vehicle lifter 302 to be mounted to connection joint(s) 500 discussed above. This embodiment allows vehicle lifter 302 to be mounted and unmounted to pickup 100. Mounting bracket 600 can be integral with support bar 406 or can be welded to support bar 406. Mounting bracket 600 has a C-shaped body 602, which can have an upper aperture 604 and a lower aperture 606. To connect vehicle lifter 302 to pickup 100, operator 210 would back pickup 100 up to vehicle lifter 302 to roughly align connection joints 500 to mounting brackets 600. Operator 210 could then adjust the height of mounting brackets 600 using a hand cranked jack 608. Hand cranked jack 608 can be coupled to an arm 610 of support bar 406 which extends rearward of support bar 406. Hand cranked jack can be permanently mounted to arm 610 or it can be attached to arm 610 through a rotatable bracket 612 which allows jack 608 to be rotated upward 90°, or greater, to be stored when pickup 100 is in motion. It also allows jack 608 to be rotated downward 90°, or greater, to support vehicle lift 302 when vehicle lift is not in use and being stored. To hold jack 608 in place a cotter pin can be placed in aperture 614.

Hand crank 616 can be rotated clockwise or counter clockwise to raise and lower vehicle lifter 302. Operator 210 can then further backup pickup 100 so as to insert connection joint 500 with mounting bracket 600. As connection joint 500 and mounting bracket 600 are coming together extension tooth(s) 514 can act to guide mounting bracket 600 into connection joint 500. For example, as operator 210 is backing up, if pickup 100 and vehicle lifter 302 are not perfectly aligned, as pickup 100 and vehicle lifter 302 come closer together, extension tooth(s) 514 can act to meet mounting bracket 600 and guide it between connection joints 500. Thus aligning connection joint 500 and mounting bracket 600. When the operator has aligned connection joint 500 to mounting bracket 600, the user can manipulate vehicle lifter 302 using jack 608 to align upper aperture 604 with mounting bracket upper aperture 510. Operator 210 can then insert a cotter pin assembly to ensure connection between pickup 100 and vehicle lifter 302. The operator can also slide a hitch pin or lock pin 618 through lower aperture 606 ensuring a portion of lock pin 618 extends beyond jaw portion 512 of each connection joint. Vehicle lifter 302 is now securely connected to pickup 100. Operator 210 can now fully lower jack 608, thus pulling jack leg 620 up within jack body 622. Jack 608 can now be rotated 90° rearward and secured in place. After electrical connection is made vehicle lifter is now ready for operation with pickup 100.

Again with reference to FIG. 6, hydraulic pump motor 624 is shown within the front of housing 342. Also shown within the front of housing 342 is remote unit 626, which allows operator 210 to remotely operate vehicle lifter 302 as will be discussed in greater detail below. Winch 628 is shown mounted to trolley frame 322. The operation of winch 628 is discussed in greater detail below. Also shown are front wheels 630 which act to allow for easy rolling insertion of frame 304 during wench operation. Further, horizontal wheels 632 mounted to trolley frame 322 allow for alignment and easy movement of trolley frame 322 along supports 314 and 316. While only one horizontal wheel 632 is shown, there is another wheel 632 mounted at the front of trolley frame 322 on the opposite side of support 316 and there are two rear wheels 632 at the rear of trolley frame 322, each located on opposite sides of supports 314 and 316 respectively. Outside vertical wheels 336 can be seen as well. Outside vertical wheels act as a rolling support for frame 304 as frame 304 is being moved in and out of bed floor 200.

Figure 7:
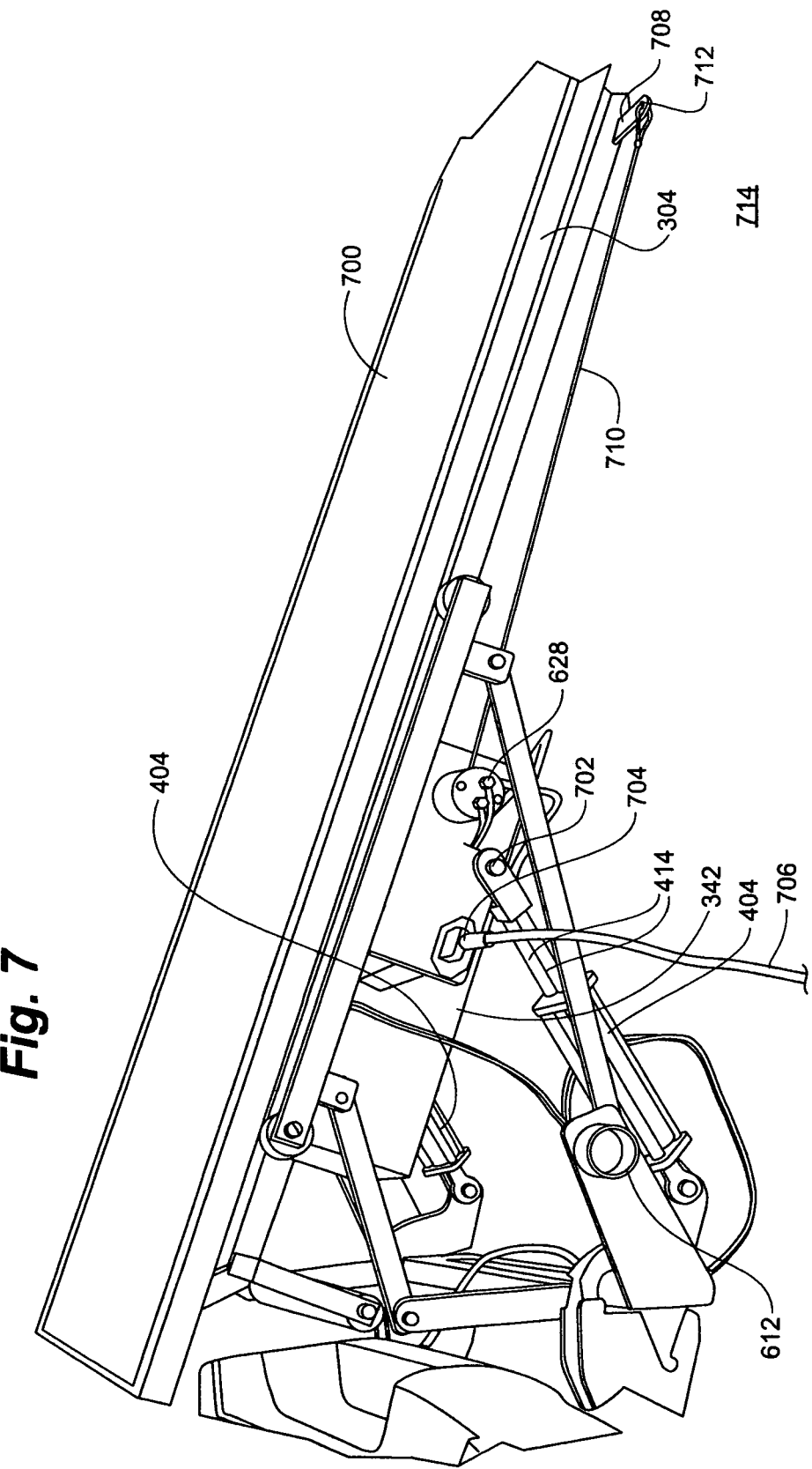
FIG. 7 shows an elevated profile view of a vehicle lifter attached to a pickup in a lowered position in an embodiment of the present invention.

With respect to FIG. 7, an elevated profile view of a vehicle lifter attached to a pickup in a lowered position in an embodiment of the present invention is shown. In this embodiment, hand-cranked jacks 608 have been removed from rotatable bracket 612. Jacks 608 can be removed at the operator's discretion to provide use of vehicle lifter 302 without jacks 608. For example, in a situation when operator 210 knows he/she will not be removing vehicle lifter 302 until he/she returns to the location where jacks 608 are stored. Vehicle lifter 302 is also shown with lifter floor 700 attached to frame 304. Lifter floor 700 allows for most any vehicle or item to safely be rested upon vehicle lifter 302 and be inserted into bed floor 200. Lifter floor 700 can be attached to frame 304 in most any fashion such as welding, tie straps or nut and bolt assemblies without departing from the spirit of the invention.

In this embodiment, hydraulic lifters 404 are shown attached to housing 342 using a cotter pin assembly 702. Hydraulic lifters 404 can be mounted to most any forward area, as seen in the embodiments above, to lift vehicle lifter 302 upward without departing from the spirit of the invention. In the lowered position, hydraulic cylinders 414 are shown in a recessed or lower state. Operator control connection 704 can be located on housing 342. Coupled to operator control connection is operator cord 706 which is connected to an operator control panel which is discussed in greater detail below. Operator control connection 704 is electrically coupled to winch 628 and to hydraulic pump motor 624 and obtains its power from vehicle outlet 428 as discussed earlier. Vehicle outlet 428 provides 12V, which can be converted to run both winch 628 and hydraulic pump motor 624.

Winch 628 is coupled to a finger 708 located at a forward end of support 314 by winch line 710. Winch line 710 is attached to finger 708 through aperture 712. Finger 708 could be integral with support 314 or could be attached by other methods such as welding without departing from the spirit of the invention.

With reference again to FIG. 7, operator 210 has vehicle lifter 302 in the lowered position. Frame 304 and lifter floor 700 are located adjacent or touching ground 714 to make it easy for operator 210 to load a vehicle or most any type of material onto lifter floor 700. Operator 210 has worked the operator controls to have the winch in the lowered position thus allowing frame 304 to roll on trolley frame 322 and reach ground 714. When operator 210 has loaded a vehicle(s) or other materials onto lifter floor 700, operator 210 can manually operate the controls to begin raising frame 304.

Figure 8:
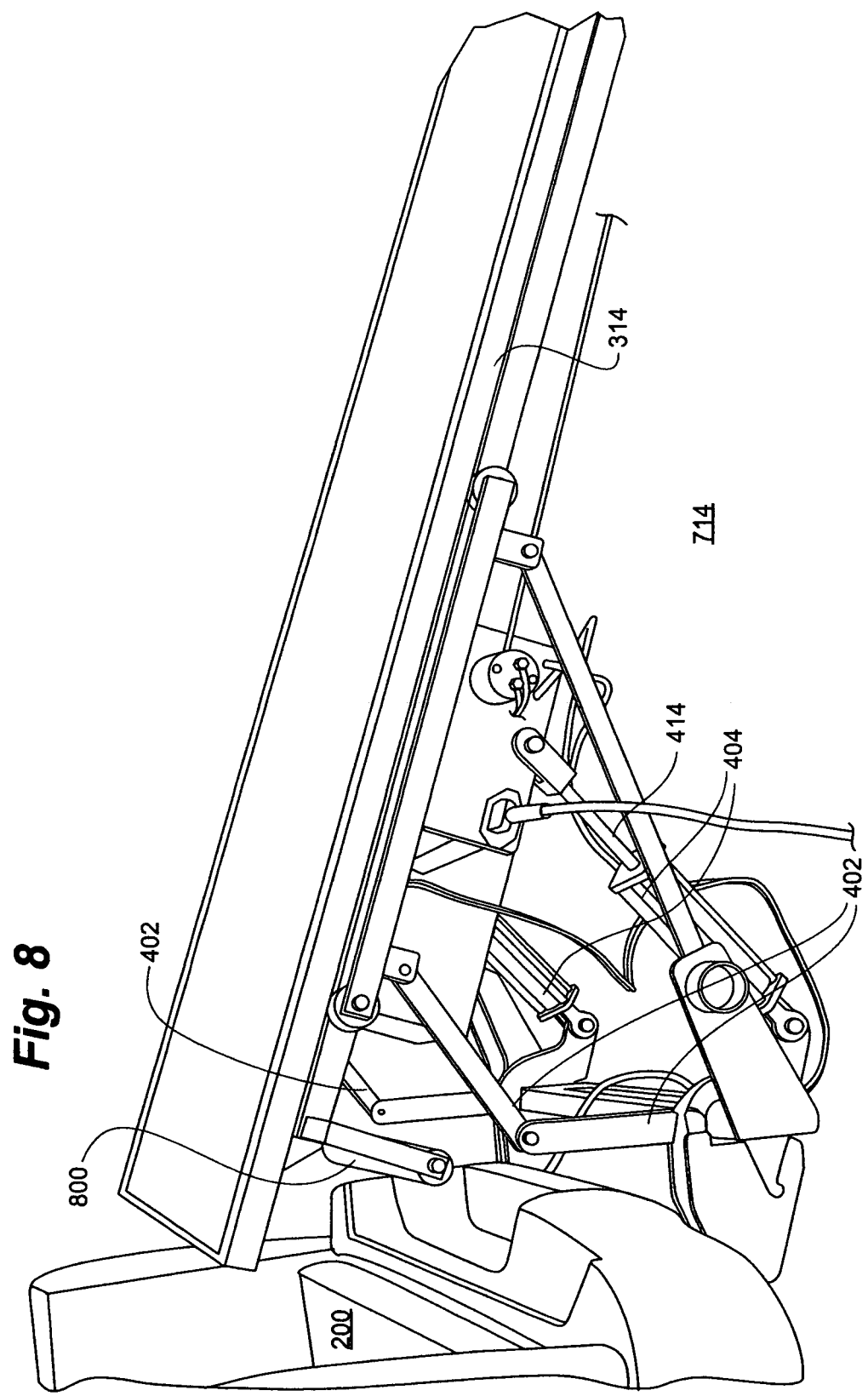
FIG. 8 shows an elevated profile view of a vehicle lifter attached to a pickup being raised in an embodiment of the present invention.

With reference to FIG. 8, an elevated profile view of a vehicle lifter attached to a pickup being raised in an embodiment of the present invention is shown. When operator 210 presses a "raise" button on a control panel, hydraulic lifters 404 begin to extend hydraulic cylinders 414 to raise frame 304 off of ground 714. Operator 210 will raise frame 304 until roller 800 (or wheels in other embodiments) is adjacent or within truck bed 200. As Hydraulic lifters 404 begin to extend, inner arms 402 and outer arms 400 are pushed toward pickup 100 by the upward pressure, thus moving frame 304 from an angular position to a horizontal position when fully lifted.

Figure 9:
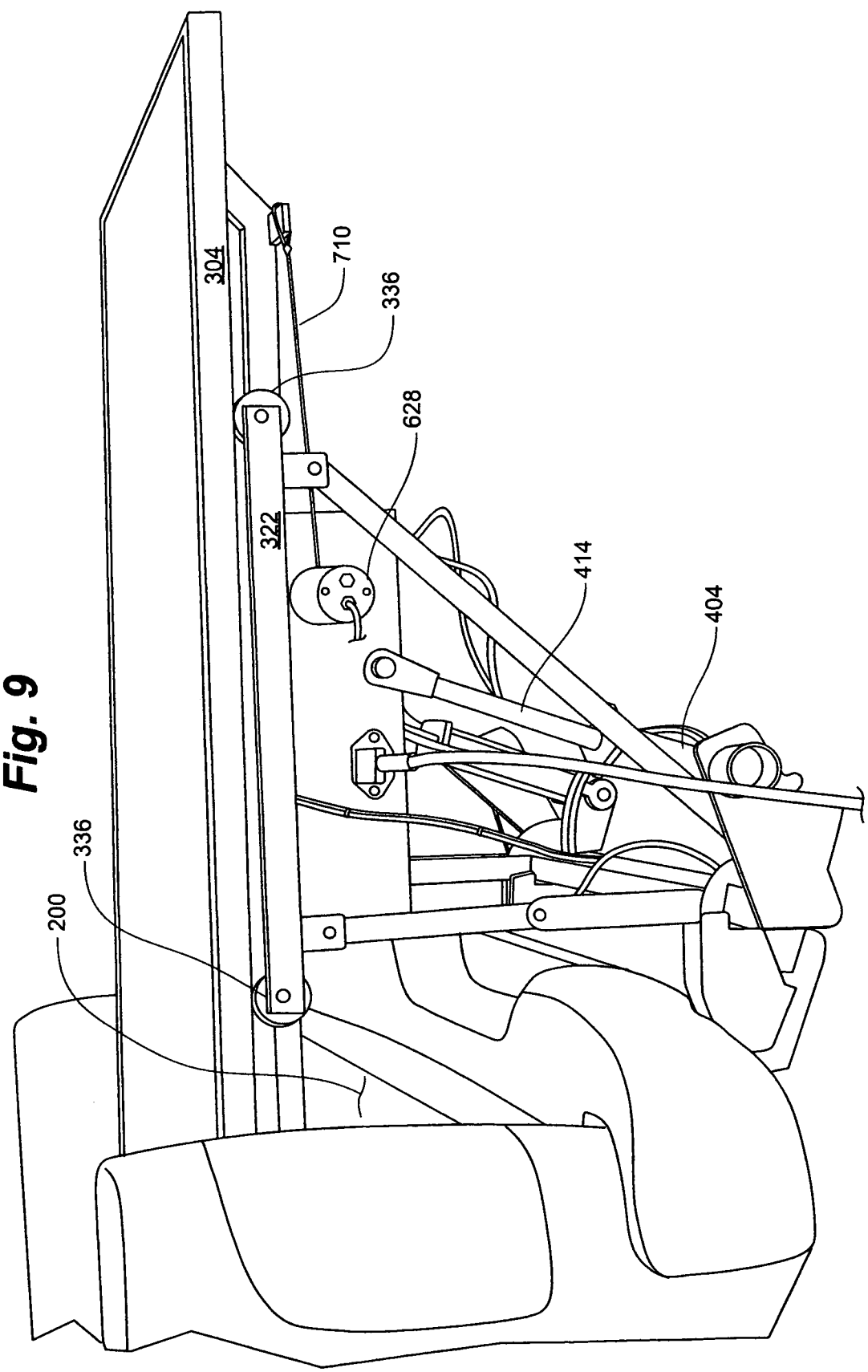
FIG. 9 shows an elevated profile view of a vehicle lifter attached to a pickup in a raised position in an embodiment of the present invention.

With reference to FIG. 9, an elevated profile view of a vehicle lifter attached to a pickup in a raised position in an embodiment of the present invention is shown. When frame 304 is substantially horizontal with truck bed 200, hydraulic lifters 404 are extended with hydraulic cylinders 414 extended, operator 210 can press a "retract" button on a control panel, which will power winch 628. Winch 628 will begin rolling up winch line 710, which acts to pull frame 304 along trolley frame 322 on wheels 336 and 632 into truck bed 200. Roller 800 can roll along truck bed 200 as winch 628 pulls frame 304 into truck bed 200.

Figure 10:
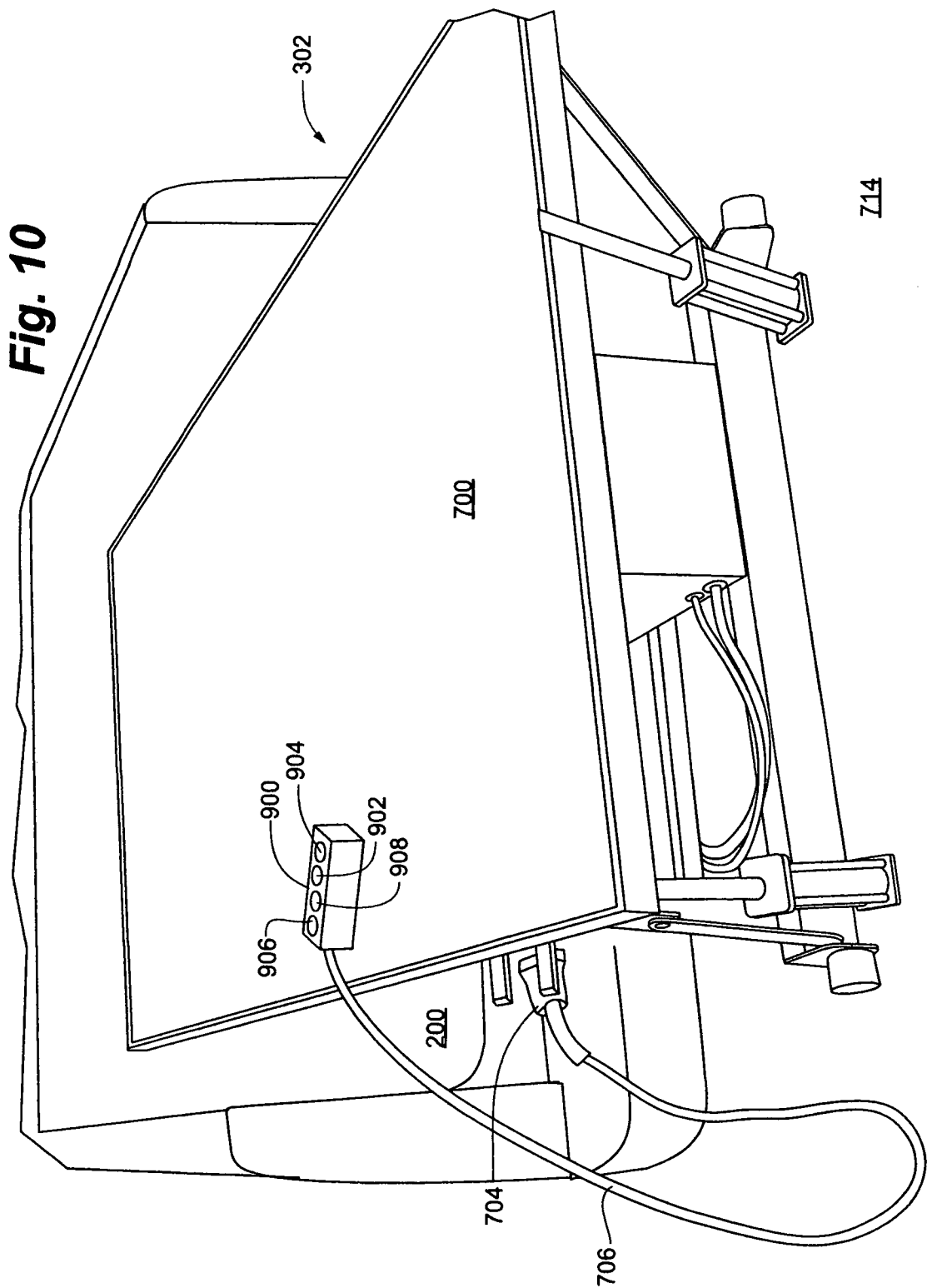
FIG. 10 shows an elevated rear view of a vehicle lifter attached to a pickup in a stowed position in an embodiment of the present invention.

With reference to FIG. 10, an elevated rear view of a vehicle lifter attached to a pickup in a stowed position in an embodiment of the present invention is shown. Vehicle lifter 302 is shown in a stowed position. When winch 628 has fully pulled frame 304 back to the stowed position, operator 210 can stop winch 628 at control panel 900. It is noted, frame 304 is located above wheel wells 114. Thus, wheel wells 114 cannot act as a barrier to stowing vehicles or any other materials as can often happen when stowing a vehicle or other materials on truck bed 200. When vehicle lifter 200 is in the stowed position, operator 210 can disconnect operator cord 706 from operator control connection 704 and stow control panel 900 within truck 100.

When operator 210 would like to offload whatever is located on lifter floor 700, operator 210 would reconnect control panel 900 to operator control connection 704. Operator 210 could then press a lower button 902, adjacent to raise button 904, and begin hydraulic lifters 404 retracting hydraulic cylinders 414, thus moving frame 304 into an angled position downward away from truck bed 200. Operator 210 could then press an "extend" button 906, adjacent to a "retract" button 908, to power winch 628 to begin slowly letting out winch line 710 until frame 304 is adjacent or touching ground 714. Operator 210 is then able to offload some or all of the vehicles or materials on lifter floor 700.

It is fully contemplated control panel 900 could be wireless utilizing remote unit 626. In this manner, operator 210 could, for example, ride an ATV onto lifter floor 700 and then remotely operate control panel 900 to lift frame 304 upward and then power winch 628 to pull frame 304 into a stowed position. This operation could also be performed in reverse with the operator lowering frame 304 and extending winch line 710.

Figure 11:
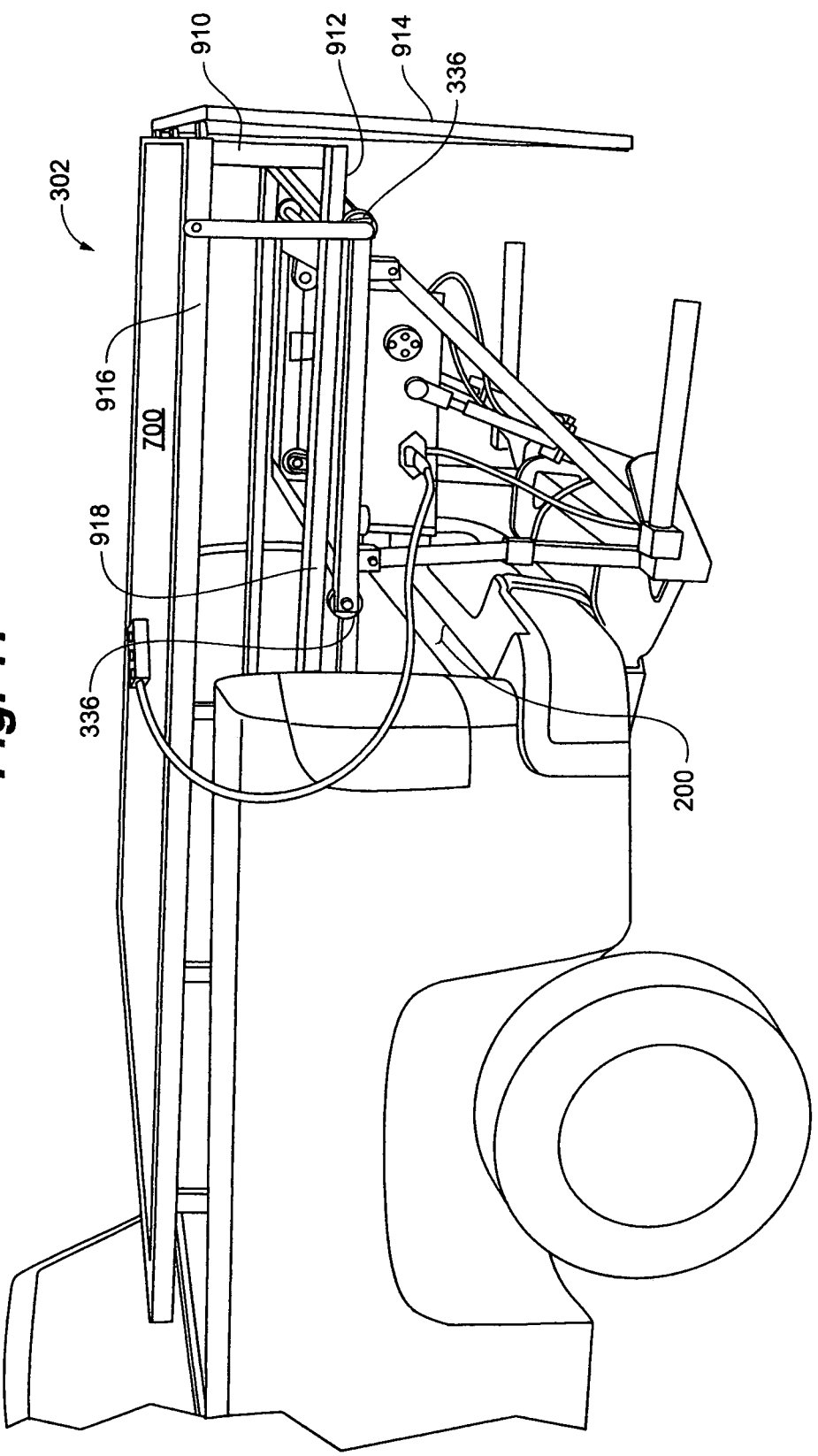
FIG. 11 shows a profile view of a vehicle lifter attached to a pickup in a stowed position in an embodiment of the present invention.

With reference to FIG. 11, a profile view of a vehicle lifter attached to a pickup in a stowed position in an embodiment of the present invention is shown. In this embodiment, vehicle lifter 302 has a ramp [914] coupled to frame 304. Ramp [914] allows for easier loading of vehicles onto lifter floor 700. Further, frame [912] can be a "box" frame, having an upper frame portion [916] and a lower frame portion [918] which are joined at the corners by a frame support 910. In this embodiment, frame [912] can simply be slid upon outer wheels 336 for frame to be stored within truck bed floor 200.

Thus, embodiments of the VEHICLE LIFTER are disclosed. One skilled in the art will appreciate the present teachings can be practiced with embodiments other than those disclosed. The disclosed embodiments are presented for purposes of illustration and not limitation, and the present teachings are limited only by the following claims.

What is claimed is:

1. A lifter, comprising:
   a. movable box frame having a front end member, a rear end member, a left side member and a right side member, the box frame having a pair of spaced support members extending downward from the front end member then parallel to the frame and then upward to the rear end member;

a floor coupled to the frame;

a movable trolley frame located between the box frame and the spaced support members, the trolley frame having a front bar, a rear bar, a right side bar and a left side bar, said trolley frame comprising wheel assemblies disposed to ride along on said pair of spaced support members and wherein said right side bar and left side bar of said trolley frame support said right side member and said left side member, respectively, of said box frame;

a main support bar assembly comprising spaced mounting brackets for removably coupling a main support bar to a vehicle using pins, said support bar being connected by spaced struts to the rear bar of said trolley frame;

a hydraulic lifter operably coupled to the main support bar and the trolley frame; and a plurality of spaced arms operably coupled to the main support bar and connected directly to the trolley frame.

2. The lifter of claim 1, wherein said trolley frame further comprises at least one vertical wheel coupled to the right side bar and at least one vertical wheel coupled to the left side bar.

3. The lifter of claim 2, wherein said trolley frame further comprises at least one horizontal wheel coupled to the front bar and at least one horizontal wheel coupled to the rear bar.

4. The lifter of claim 3, further comprising a winch operably coupled to the trolley frame.

5. The lifter of claim 4, further comprising a winch line operably coupled to the winch at one end of the winch line and coupled to a support adjacent to the front end of the box frame at another end of the winch line.

6. A lifter comprising:
   a main support bar assembly comprising spaced mounting brackets for removably coupling a main support bar to spaced connection joints using cotter pins, said connection joints being connected to a pickup truck;

a movable box frame having a front end member, a rear end member, a left side member and a right side member, the movable box frame having a pair of spaced support segmented members extending downward from the front end member in a first segment, extend parallel to the left side member and right side member in a second segment and extend upward to the rear end member in a third segment;

a floor coupled to the frame;

a movable trolley frame, located between the movable box frame and the spaced support members and supported by and movable along the spaced support members, the box frame being movable with respect to the trolley frame and the trolley frame having a front bar, a rear bar, a right side bar and a left side bar, the side bars of said trolley frame supporting the side members of said box frame;

a hydraulic lifter comprising a plurality of spaced cylinders operably coupled to the main support bar and connected directly to the trolley frame;

a pair of spaced inner arms operably coupled to the front bar of the trolley frame and the main support bar;

a pair of spaced outer arms operably coupled to the main support bar and the rear bar of the trolley frame.

7. The lifter of claim 6, further comprising a winch operably coupled to the trolley frame and a winch line operably coupled to the winch at one end of the winch line and to a support adjacent to the front end of the trolley frame.

8. The lifter of claim 7 further comprising, at least one vertical wheel coupled to the right side bar and at least one vertical wheel coupled to the left side bar of the trolley frame whereby the box frame can roll along moving relative to said trolley frame when the winch pulls the box frame into a truck bed.

9. The lifter of claim 8, wherein the hydraulic lifter operates to move the trolley frame between a position at an angle to a horizontal position and a horizontal position.

10. The lifter of claim 8, further comprising a control panel electrically coupled to the winch.

11. A vehicle lifter, comprising:
- a floor;
- a movable box frame having spaced front and rear members and spaced side members operably coupled to the floor, the box frame having a pair of spaced support members extending from one end of the box frame to an opposite end of the box frame substantially parallel to the side members and located beneath the level of the box frame being connected thereto by other members;
- a movable trolley frame having spaced front and rear members and spaced side members located between the box frame and the support members, wherein the trolley frame has spaced wheel assemblies disposed to roll on said spaced support members and wherein said spaced side members of said trolley frame are located beneath and support said spaced side members of said box frame;
- a support bar assembly comprising spaced mounting brackets for coupling a support bar to a vehicle, said mounting brackets having quick disconnect pinned assemblies, said support bar being connected by spaced struts to the trolley frame;
- a system for adjusting the height of said mounting brackets to facilitate coupling said support bar to a vehicle; and
- a hydraulic lifter operably coupled to the support bar and connected directly to the trolley frame.

12. The vehicle lifter of claim 11, further comprising a winch operably coupled to the trolley frame.

13. The vehicle lifter of claim 12, further comprising a winch line operably coupled to the winch at one end of the winch line and to the box frame at another end of the winch line.

14. The vehicle lifter of claim 13, further comprising a housing coupled to the trolley frame.

15. The vehicle lifter of claim 14, further comprising a hydraulic motor within the housing.

16. The vehicle lifter of claim 15, further comprising a hydraulics container within the housing.

17. The vehicle lifter of claim 11, wherein said pair of spaced support members are connected to said box frame by elbow members.

\* \* \* \* \*

UNITED STATES PATENT AND TRADEMARK OFFICE
CERTIFICATE OF CORRECTION

| | | |
|---|---|---|
| PATENT NO. | : 9,227,544 B2 | |
| APPLICATION NO. | : 13/067326 | |
| DATED | : January 5, 2016 | |
| INVENTOR(S) | : Lawrence Rogge | |

It is certified that error appears in the above-identified patent and that said Letters Patent is hereby corrected as shown below:

Claims
In claim 6, column 12, line 53, delete the word "bars" and insert the word --members--; and,
in line 54, delete the word "members" and insert the word --bars--.

Signed and Sealed this
Fifteenth Day of March, 2016

Michelle K. Lee
*Director of the United States Patent and Trademark Office*